United States Patent [19]

Kaukaskie

[11] Patent Number: 4,539,863
[45] Date of Patent: Sep. 10, 1985

[54] DUAL BRAKE PEDAL LOCK MECHANISM

[75] Inventor: Donald C. Kaukaskie, Dubuque, Iowa

[73] Assignee: Deere & Company, Moline, Ill.

[21] Appl. No.: 553,018

[22] Filed: Nov. 18, 1983

[51] Int. Cl.$^3$ .............................................. G05G 5/20
[52] U.S. Cl. ...................................... 74/540; 74/512; 74/541
[58] Field of Search ............... 74/541, 540, 478.5, 74/529, 533, 534, 536, 542, 560, 562.5, 512

[56] References Cited

U.S. PATENT DOCUMENTS

| | | | |
|---|---|---|---|
| 1,014,069 | 1/1912 | Lambert | 74/540 |
| 1,654,321 | 12/1927 | Collins | 74/540 |
| 1,657,623 | 1/1928 | Heinsius | 74/529 X |
| 1,927,209 | 9/1933 | Gilmore | 74/529 X |
| 1,966,551 | 7/1934 | Howard | 74/540 |
| 2,180,209 | 11/1939 | Johnson | 74/541 X |
| 2,388,002 | 10/1945 | Maiwald | 74/540 |
| 2,504,258 | 4/1950 | Elenewicz | 74/478.5 |
| 2,553,119 | 5/1951 | Sprick | 74/540 |
| 2,844,046 | 7/1958 | Reynolds | 74/542 |
| 3,494,449 | 2/1970 | Umeda et al. | 192/13 |

*Primary Examiner*—Gary L. Smith
*Assistant Examiner*—Rodney M. Lindsey

[57] ABSTRACT

A dual brake pedal lock mechanism includes a pair of lock members individually mounted on a shaft for limited pivotal movement relative thereon. The shaft has a handle connected thereto for respectively bringing the pair of lock members into engagement with racks of teeth of a pair of brake pedals so as to retain them in respective depressed, brake-engage positions. The mountings of the pair of lock members permit one brake pedal to be depressed further than the other without effecting disengagement of the other brake pedal from its associated lock member.

5 Claims, 2 Drawing Figures

DUAL BRAKE PEDAL LOCK MECHANISM

BACKGROUND OF THE INVENTION

The present invention relates to a lock mechanism for selectively fixing a pair of brake pedals in their brake-apply position.

The steering of crawler tractors is often effected by selectively braking the power flow to one or the other of the track final drives through the selective application of a pair of brake pedals. The brake mechanisms often undergo different amounts of wear during operation whereby the pair of pedals are required to be depressed by different amounts in order to effect full engagement of the associated brake.

Up to now, a problem has arisen when using one mechanism for effecting locking of both of a pair of brake pedals in their engaged conditions as one pedal will engage its brake before the other pedal is depressed far enough to engage its brake. Any attempt to depress this other pedal for enough to engage its brake automatically releases the one pedal. Now there is provided a brake lock actuator which avoids the above-noted problem.

SUMMARY OF THE INVENTION

According to the present invention, there is provided a novel brake lock mechanism for locking both pedals of a pedal steer crawler, for example, in a fully engaged condition.

An object of the invention is to provide a brake lock mechanism for permitting each of a pair of brake pedals to be locked individually, if so desired, without unlocking the other pedal and still permit both pedals to be locked or unlocked simultaneously or to remain locked when pressed down simultaneously while the lock actuator is in a lock condition.

A more specific object is to provide a dual brake pedal lock mechanism having two lock members separately swivelly mounted on a rod, forming part of a lever, for movement to and from engagement with respective racks of teeth provided on a pair of brake pedals and to provide a spring connection between the lock members and the rod for permitting relative movement between the lock members.

These and other objects will become apparent from a reading of the following description together with the appended drawing.

DESCRIPTION OF THE PREFERRED EMBODIMENT

Figure 1:
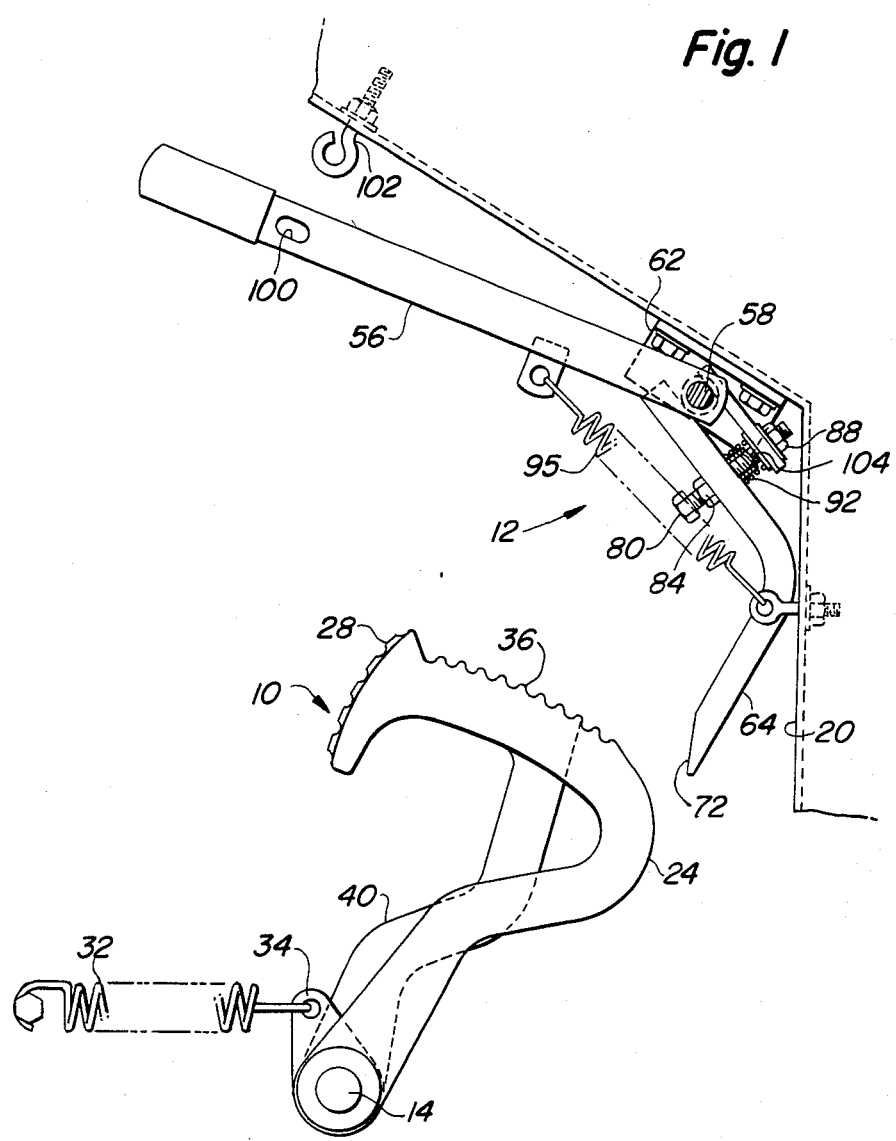
FIG. 1 is a right-side elevational view of the brake pedals and pedal lock actuator of a pedal-steered crawler tractor.
Figure 2:
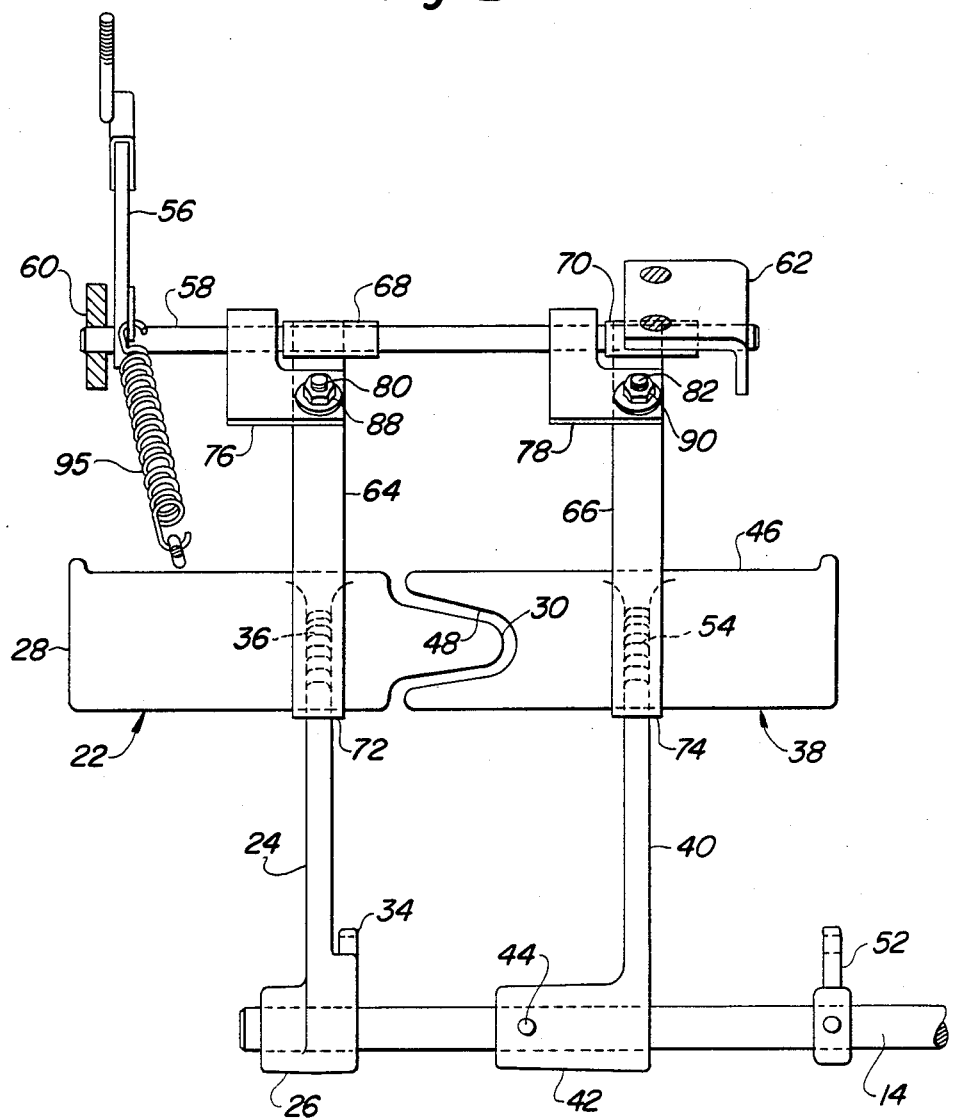
FIG. 2 is a front elevational view of the structure shown in FIG. 1.

Referring now to the drawing, there is shown a dual brake pedal arrangement 10, as would be used for pedal-steering a crawler tractor, for example. A lock mechanism 12 is associated with the dual brake pedal arrangement for simultaneously locking the pedals in a depressed, brake-engage position.

Specifically, the dual pedal arrangement 10 includes a transverse shaft 14 journalled in spaced brackets (not shown) fixed to a support frame. A right-hand pedal 22 includes an arm 24 having one end defined by a cylindrical portion 26 rotatably received on the shaft 14. The opposite end of the arm 24 is defined by a foot-engageable tread or pad 28 having a leftwardly projecting tongue 30. A pedal return spring 32 is coupled between a frame 20 and a lug 34 projecting from the cylindrical portion 26. Provided along the arm 24 adjacent the tread 28 for being engaged by the lock mechanism 12, in a manner set forth below, is a rack of teeth 36. A linkage (not shown) is connected between the pedal 22 and the right-hand brake mechanism.

A left-hand pedal 38 includes an arm 40 having one end defined by a cylindrical portion 42 received on the shaft 14 and secured thereto by a fastener 44. The opposite end of the arm 40 is defined by a foot-engageable tread or pad 46 having a groove or slot 48 formed in its right-hand end and receiving the tongue 30 when the treads 28 and 46 are located side-by-side, as shown. A pedal return spring (not shown) is coupled between the frame 20 and a lug 52 fixed to the shaft 14. Provided along the arm 40 adjacent the tread 46 is a rack of teeth 54 like the teeth 36 on the pedal arm 24.

It will be appreciated then that the dual pedal arrangement just described can be operated such as to effect separate or simultaneous braking operation of associated right- and left-hand brake mechanisms.

The dual brake pedal lock mechanism 12 comprises an actuator lever assembly including a handle 56 welded to one end of a shaft 58 rotatably mounted in spaced brackets 60 and 62 fixed to the frame 20 at an area above and forward of the dual pedal arrangement 10. Right- and left-hand lock members 64 and 66 in the form of angled bars are swivelly mounted on the shaft 58 respectively by sleeves 68 and 70 which are welded to the members 64 and 66 adjacent their upper ends. The members 64 and 66 are located such that their respective lower ends 72 and 74 are located for engaging the racks of teeth 36 and 54 when the handle 56 is raised while the brake pedals are depressed.

Provided for connecting the lock members 64 and 66 to the shaft 58 so as to be controlled by movement of the handle 56 are right- and left-hand flat L-shaped brackets 76 and 78 having first legs welded in perpendicular relationship to the shaft 58 at respective locations adjacent the sleeves 68 and 70. The brackets 76 and 78 have second legs respectively located forwardly of the lock members 64 and 66. Cap screws 80 and 82 are respectively threaded through the lock members 64 and 66 and are fixed in place by jam nuts, only the right jam nut 84 being shown. The cap screws 80 and 82 are loosely received in holes provided in the second legs of the brackets 76 and 78 and lock nuts 88 and 90 are threaded on the cap screws for keeping the brackets on the cap screws. The lock members 64 and 66 are spaced from the brackets 76 and 78 and received about the cap screws in the space are coil compression springs, only the right spring 92 being shown, which establish a one-way resilient connection between the lock members and brackets.

Thus, it will be appreciated that the brake pedals 22 and 38 may be locked in depressed, brake-engage positions by lifting the handle 56, from its pedal-release position shown, against the bias of a return spring 95, to a pedal-engage position wherein the lower ends 72 and 74 of the lock members 64 and 66 are positioned to engage the racks of teeth 36 and 54. If one of the pedals 22 or 38 needs to be depressed further than the other so as to achieve full engagement of its associated brake, that pedal only is depressed and its rack of teeth will act on a respective ramp surface of the lower ends 72 and 74 of the lock members so as to deflect the associated lock member and move to a new position.

For affording a measure of vandal protection, the handle 56 is provided with a hole 100 which aligns with an eye of an eyebolt 102, that is fixed to the frame 20, to receive a padlock (not shown) when the handle is in its raised pedal lock position. Provided for cooperating with the padlock in this endeavor is a pair of spacers, only the right spacer 104 is shown, respectively received within the springs on the cap screws 80 and 82. The spacers serve to limit the amount that the lock members 64 and 66 can flex relative to the brackets 76 and 78 so that the lock members cannot be dislodged from the racks of teeth of the pedals 22 and 38.

The operation of the invention is thought to be clear from the foregoing description and for the sake of brevity is not reiterated here. Suffice it to say that by connecting the lock members 64 and 66 to the shaft 58 for independent movement relative to each other it is possible for the pedals 22 and 38 to be either individually or simultaneously locked and to be simultaneously unlocked. Further, vandalism protection is afforded by locking the actuator handle 56 in its pedal lock position.

I claim:

1. In a combination including a pair of brake pedals mounted in side-by-side relationship to each other for pivotal movement between brake-release and brake-engage positions and each including an arm provided with a rack of teeth, and a pedal lock mechanism including a pair of lock members pivotally mounted for selective movement between pedal-release positions wherein they are free of said rack of teeth and pedal lock positions wherein they engage said rack of teeth for locking said brake pedals in their brake-engage positions, an improved pedal lock mechanism, comprising: a pivotally mounted shaft movable between first and second positions corresponding to said pedal-release and pedal-lock positions; first and second connection means respectivley connecting said pair of lock members to said shaft for pivotal movement therewith and for limited swivel movement relative thereto and to each other; said first and second connection means respectively including first and second biasing means acting between the shaft and said pair of lock members and urging the latter toward their pedal-lock positions for thereby establishing a pair of one-way resilient connections permitting the pedals to be either independently or simultaneously locked in and simultaneously released from their brake-engage positions.

2. The combination defined in claim 1 wherein each of said first and second connection means includes a sleeve fixed to one end of one of the pair of lock members and pivotally received on said shaft; a bracket fixed to the shaft and having a portion confronting said one of the pair of lock members; a cap screw threaded through said one of the pair of lock members and loosely received in a hole provided in the portion of the bracket; a lock nut preventing separation of the cap screw from said portion and a coil compression spring received on said cap screw between said bracket portion and said one of the pair of lock members so as to permit the latter to be resiliently pivoted relative to the other lock member.

3. The combination defined in claim 2 wherein lock means are provided for securing said shaft in a rotated position for holding said lock members in engagement with the rack of teeth of the brake pedals when the latter are in their brake-engage positions; and a sleeve received on each cap screw coextensive with the spring for limiting the amount of swivelling of an adjacent lock member relative to the other lock member.

4. A lock mechanism for selectively locking a pair of brake pedals in depressed brake-engage positions, comprising: an actuator assembly including a pivotally mounted shaft; a handle rigidly fixed to the shaft for moving the latter between pedal-release and pedal lock positions; a pair of pedal lock members, each having a first end swivelly mounted on said shaft and a second end adapted for locking engagement with a respective one of a pair of depressed brake pedals when the lever is in its pedal lock position; and a pair of means respectively connected between said shaft and said pair of pedal lock members for establishing a predetermined limited amount of swivelling of the latter relative to the shaft and, hence, to each other; and said pair of means including resiliently yieldable means urging said pair of pedal-lock members toward positions corresponding to said pedal-lock positions.

5. The lock mechanism defined in claim 4 wherein each of said pair of means comprises a cap screw threaded through one of the lock members; a bracket fixed to the shaft and having a portion provided with a hole receiving said cap screw; a lock nut threaded onto the cap screw for preventing it from separating from said portion; said portion being spaced from said one of the lock members; and a coil compression spring being received on said cap screw and located between said portion and said one of the lock members.

* * * * *